United States Patent [19]

Herrick

[11] 4,016,398
[45] Apr. 5, 1977

[54] FUME EXTRACTION CONTROL FOR WELDING GUN
[75] Inventor: George R. Herrick, Mazon, Ill.
[73] Assignee: Caterpillar Tractor Co., Peoria, Ill.
[22] Filed: May 1, 1975
[21] Appl. No.: 573,653

Related U.S. Application Data
[63] Continuation of Ser. No. 412,453, Nov. 2, 1974, abandoned.

[52] U.S. Cl. .................................. 219/130; 219/74; 219/136
[51] Int. Cl.² ........................................... B23K 9/00
[58] Field of Search ............ 219/130, 136, 74, 75; 15/421

[56] References Cited
UNITED STATES PATENTS

| | | | |
|---|---|---|---|
| 2,176,139 | 10/1939 | Lofgren | 15/421 |
| 2,978,733 | 4/1961 | Wahlborg | 15/421 |
| 3,048,876 | 8/1962 | Kemnitz | 15/421 |
| 3,440,681 | 4/1969 | Hixson et al. | 15/421 |
| 3,775,587 | 11/1973 | Lindkvist | 219/130 |
| 3,798,409 | 3/1974 | Troyer et al. | 219/130 |
| 3,886,344 | 5/1975 | Frantzreb, Sr. et al. | 219/130 |
| 3,909,586 | 9/1975 | Landis et al. | 219/130 |

OTHER PUBLICATIONS

K. G. Kollman, "Solving the Problem of GMAW Fume Extraction," Welding Journal, pp. 503–508, Aug. 1973.

Primary Examiner—J. V. Truhe
Assistant Examiner—Clifford C. Shaw
Attorney, Agent, or Firm—Phillips, Moore, Weissenberger Lempio & Majestic

[57] ABSTRACT

A welding gun is provided having vacuum fume extraction means wherein the level of vacuum exerted at the arc welding zone is regulated to avoid extracting shielding gas supplied to the welding zone. The vacuum level is regulated by admitting sufficient air to a fume extracting passage provided within the gun to reduce the vacuum to the desired level.

3 Claims, 1 Drawing Figure

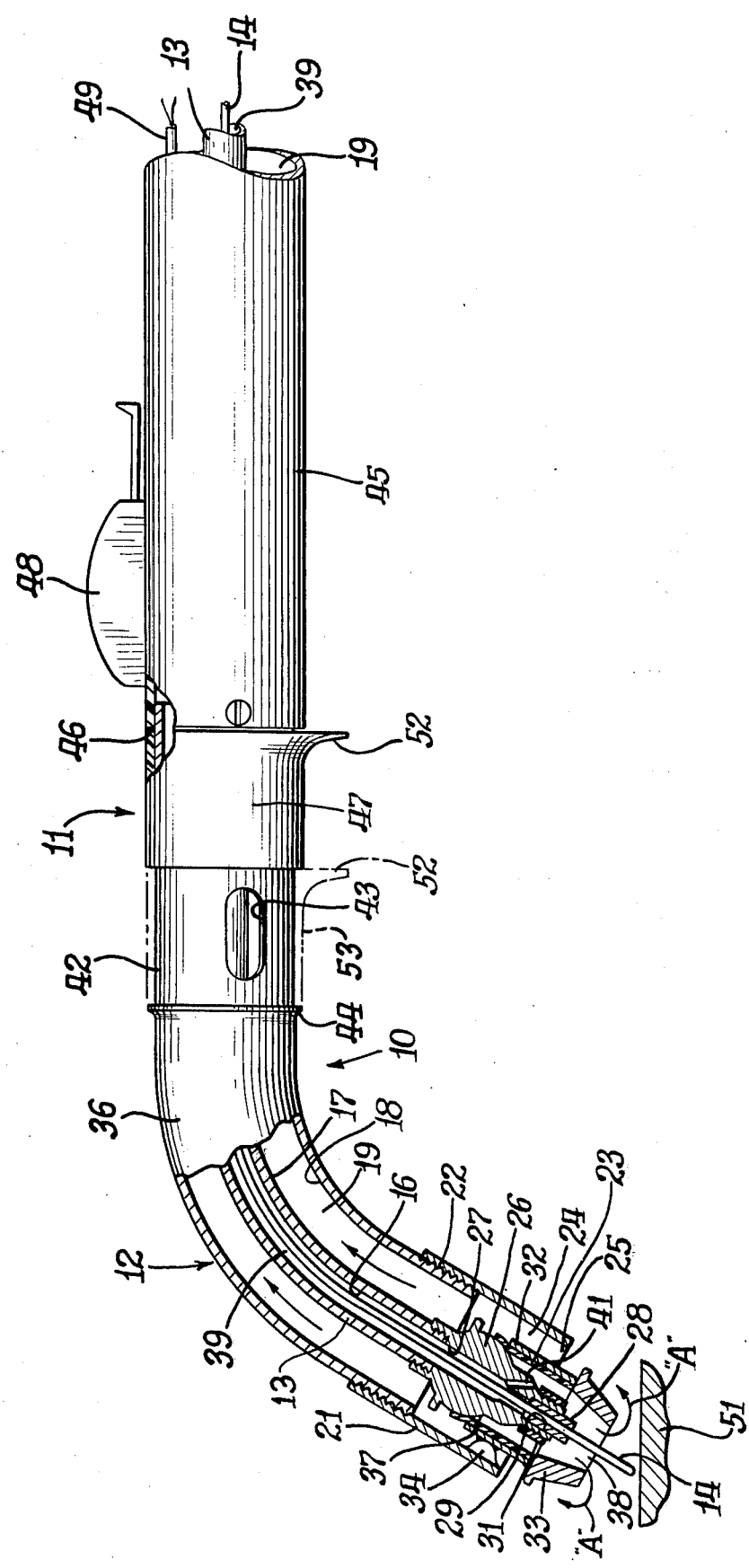

FUME EXTRACTION CONTROL FOR WELDING GUN

This is a continuation of Ser. No 412,453, filed Nov. 2, 1974, now abandoned.

BACKGROUND OF THE INVENTION

This invention relates to arc welding devices provided with vacuum fume extraction means. This invention particularly relates to arc welding guns provided with vacuum fume extraction means including means for regulating the level of vacuum at the fume intake port of the fume extraction device.

The fumes generated in gas shielded metal and gasless metal are welding of various substrates constitute both a health and visual problem for the welders. The welding industry has actively been pursuing improved ventilation systems including adapting various welding fume extractors directly to the welding gun itself. Typically, such fume extractors include vacuum fume extraction means exemplified by those described in U.S. Ser. No 107,097 filed Jan. 1, 1971, and its Continuation Ser. No. 354,193 filed Apr. 25, 1973, of common assignment herewith.

While these vacuum fume extraction means have been generally successful, it has been found that under certain operating conditions their use has interfered with the welding operation. For example, in gas-shielded arc welding the shielding gas delivered to the head portion of the welding gun is occasionally extracted along with the product welding fumes when an excessively high level of vacuum is provided by the vacuum fume extraction means. The shielding gas thus becomes less effective in isolating the welding zone from atmospheric contamination, and the resultant welds suffer from undue porosity. Properly proportioning the amount of fumes extracted relative to the amount of shielding gas delivered becomes even more difficult when the welding zone is in a confined area. Prior art welding guns with vacuum fume extraction means have typically provided only one level of vacuum, and as the guns have been operated in various working positions, the weld rate and quality of the welds have been frequently adversely affected.

It is therefore an object of this invention to provide vacuum fume extraction means, including regulating means, for use in conjunction with arc welding guns.

It is a further object of this invention to provide means for regulating the vacuum level of vacuum fume extraction means for arc welding guns.

It is an additional object of this invention to provide an arc welding gun having vacuum fume extraction means whereby the vacuum may be regulated to extract fumes during gas-shielded arc welding operations without substantially interfering with the protective function of the shielding gas.

It is another object of the invention to provide an arc welding gun having fume extraction means, including regulating means, whereby improved welds will be obtained from gas-shielded welding operations in confined area.

BRIEF SUMMARY OF THE INVENTION

The invention broadly comprises an arc welding gun operably connected to vacuum-inducing means, whereby vacuum extraction of product fumes is accomplished during arc welding operations.

The weld head portion of the arc welding gun is provided with a fume intake port, which is connected to a fume extracting passage provided through the body of the gun. Induction of a vacuum within the fume extracting passage causes ambient fumes to be drawn into the intake port and through the extracting passage to a suitably located exhaust port. Venting means for the fume extracting passage are provided in the body of the gun, conveniently in the handle thereof. The level of vacuum at the fume intake port is regulated by adjusting the venting means to admit greater or lesser amounts of air to the fume extracting passage; the greater the amount of air admitted to the passage, the lower the level of vacuum at the intake port.

Prior patents teaching vacuum control means are U.S. Pat. Nos. 3,440,681, 3,277,512 and 2,894,274.

BRIEF DESCRIPTION OF THE DRAWING

The drawing is a perspective partly broken-away view of an arc welding gun incorporating a preferred embodiment of the fume extraction means, including regulating means, of this invention.

DETAILED DESCRIPTION OF THE INVENTION

With particular reference to the drawing, an arc welding gun 10 is provided with a handle portion 11 and a weld head portion 12. Gun 10 is provided with a tubular conduit 13 containing consumable weld wire 14 in bore 16 thereof. An outer surface 17 of conduit 13 and an inner surface 18 of gun 10 define a fume extraction passage 19. A sleeve 21 is removably attached to the head portion 12 of gun 10, as by threads 22, and forms with an inner insulating sleeve 23 forward extension 24 of fume extracting passage 19, which connects with a fume intake port 25. An adapter 26 is threadably secured to tubular conduit 13, and is provided with bore 27 which is substantially aligned with bore 16 of tubular conduit 13, thereby facilitating passage of weld wire 14 therethrough. A contact tip 28 is firmly seated within counterbore 29 of adapter 26, and supports weld wire 14 as by adjustment nut 31.

In the preferred embodiment of this invention, a tube 32 is disposed in encircling relationship to insulating sleeve 23, and the rearward portion of a flow-directing nozzle 33 is brazed thereto. Radially disposed protrusions 34 on the inner surface of sleeve 21 are preferably brazed to the outer surface of tube 32, and serve to concentrically position nozzle 33, adapter 26 and tubular conduit 13 within sleeve 21 and tubular case 36 of gun 10. Adapter 26 includes a spherical shoulder 37 adapted to receive insulating sleeve 23, and protrusions 34 effect a seal between shoulder 37 and insulating sleeve 23.

In an alternative embodiment of this invention, nozzle 33 is removably attached as by thread means to tube 32 disposed about insulating sleeve 23. Tube 32 is supportively retained within weld head 12 by spring-biased protrusions 34. A weld head chuck assembly including nozzle means suitable for use with the fume extraction means of this invention exemplary of this embodiment is more fully described in application Ser. No. 366,129 by J. G. Frantzreb, Sr., filed June 1, 1973, of common assignment herewith.

For shielded gas welding, for example with $CO_2$, argon, or mixtures thereof, shielding gas passages are provided within gun 10 to a gas directing chamber 38 within nozzle 33. Preferably, shielding gas is directed through gas flow passage 39 formed by bore 16 of tubular conduit 13 and bore 27 of adapter 26 to chamber 38 via a plurality of connecting passages 41 in adapter 26. Alternative methods of supplying shielding gas to chamber 38 may be provided. For example, tube 32 may be extended to form an annular passageway between the inner surface thereof and the outer surface of tubular conduit 13. In the latter instance, of course, adapter 26 must be modified to avoid blockage of this passageway.

The control handle portion 11 of weld gun 10 includes cylindrical outer surface 42 on tublar case 36, and an air inlet opening 43 through case 36, which is in communication with fume extracting passage 19. The forward extremity of outer surface 42 includes shoulder 44, while the rearward portion is disposed closely within a posterior tubular casing 45, which is advantageously comprised of plastic or similar light weight material.

Tubular cases 36 and 45 are in an axially fixed but telescoping relationship to each other and thus define a posterior stop or shoulder 46 at the rearward end of cylindrical outer surface 42.

Handle portion 11 of gun 10 further includes slideable sleeve 47, preferably also of a plastic or similar material. Slideable sleeve 47 is axially displaceable between shoulders 44 and 46 to provide an exposed cross-sectional area for air inlet opening 43, permitting the regulation of air intake into fume extraction passage 19 through inlet opening 43.

An operator control switch 48 via a multiwire electrical conduit 49 is engaged to initiate the transmission of current through tubular conduit 13, adapter 26, contact tip 28 and weld wire 14 to a workpiece 51. Engagement of control switch 48 further causes weld wire 14 to be automatically fed to the arc welding zone, shielding gas to be supplied to chamber 38, and a vacuum to be exerted within fume extracting passage 19.

During operation, the operator's hand is in a convenient position to axially move and position slideable sleeve 47 to regulate air intake into fume extracting passage 19. This may conveniently be accomplished by engaging lip 52 of slideable sleeve 47 with a finger of the operating hand.

If weld head 12 of gun 10 is disposed in a relatively confined area, the shielding gas moving outwardly from chamber 38 may be excessively quickly extracted along with the smoke and fumes generated by the arc welding process along an arcing path generally indicated by the reference arrows "A". Since this can adversely affect the weld, slideable sleeve 47 may be positioned rearwardly from the normally closed phantom line position 53 to the solid line position shown. While the phantom line position 53 corresponds to a fully forward sleeve disposition against shoulder 44 and a completely blocked air inlet opening 43, the solid line position corresponds to a fully rearward sleeve disposition against shoulder 46 and a completely unblocked air inlet opening 43. With an unblocked air inlet opening 43, the level of vaccum at fume intake port 25 is lowered relative to the level of vacuum exerted when air inlet opening 43 is blocked, and shielding gas will remain longer along the path A and in proximity to the weld. The arc welding zone is thereby more effectively protected from atmospheric contamination, and improved welds are thereby produced in certain, relatively more confined modes of operation of the welding gun.

Air inlet opening 43 should of course be of sufficient size with respect to the vacuum level at fume intake port 25 when opening 43 is completely blocked to ensure that the vacuum level can be lowered as required to the desired level by unblocking opening 43. It should be appreciated that the operator may modulate the degree of vacuum in fume extracting passage 19 by adjusting slideable sleeve 47 to various positions between the shoulders 44 and 46, thus proportioning the flow of shielding gas and fume extraction at weld head 12.

It is of additional importance that increasing the cross-sectional area of air inlet opening 43 to allow more air into fume extraction passage 19 also results in greater cooling of control handle portion 11.

What is claimed is:

1. An arc welding gun fume extraction control for regulating the degree of fume intake at a workpiece arc welding zone in response to working conditions thereat, and for cooling a handle portion of the arc welding gun, comprising:

a fume intake port at a welding end of said welding gun:

a fume exhaust port at a handle end of said welding gun;

a tubular conduit through a single passageway in which both a weld wire and a shielding gas are fed from the handle end of said welding gun to said arc welding zone;

a tubular casing having a head portion disposed towards the welding end of said welding gun and a handle portion disposed away from the welding end of said welding gun, said casing being substantially concentrically encirclingly disposed in spaced apart relation with respect to said conduit and forming an elongated annular fume extraction passage between said conduit and said casing leading from said fume intake port to said fume exhause port, said tubular casing having an air inlet opening radially therethrough in a forward portion of said handle portion; and an axially displaceable first sleeve circumscribingly mounted on said handle portion of said tubular casing and disposed about said air inlet opening whereby said air inlet opening may be adjusted to admit varying amounts of ambient air into said fume extraction passage by manually variably displacing said first sleeve with respect to said air inlet opening to thereby coordinatedly vary the degree of fume intake at said fume intake port and the amount of air intake at said air inlet opening to adjust the cooling effect of said air on said handle portion of said tubular casing.

2. An arc welding gun fume extraction control as in claim 1, wherein said first sleeve includes a finger-engaging lip to conveniently allow axial movement of said first sleeve on said tubular casing relative to said air inlet opening.

3. An arc welding gun fume extraction control as in claim 2, further including:

a spherically shouldered adapter removably attached to and extending longitudinally from the arc welding zone end of said conduit, said adapter having a bore in substantial alignment with said conduit and including a plurality of passages from said bore for directing said shielding gas generally radially outwardly through said adapter;

a second sleeve removably mounted on and forming an extension of the arc welding zone end of the head portion of said casing;

an insulating third sleeve disposed about said adapter and extending therefrom towards said arc welding zone;

a nozzle including a substantially conically-shaped rigid body having a lip around the outer circumference of the base thereof and a tube extending from the base of said nozzle and away from said conically-shaped rigid body, said tube being concentrically disposed about and in contact with said third insulating sleeve; and a plurality of radially disposed protrusions extending radially inwardly from the inner surface of said second sleeve means and bearing against said tube to bias said tube, said insulating third sleeve and the nozzle attached thereto against said adapter to form a gas tight seal between said adapter and said insulating third sleeve which together define a chamber into which said plurality of passages direct said shielding gas, said second sleeve, said adapter, said insulating third sleeve and said tube together defining an extension of said elongated annular fume extraction passage.

* * * * *